(12) United States Patent
Kamiya et al.

(10) Patent No.: US 9,849,530 B2
(45) Date of Patent: Dec. 26, 2017

(54) ELECTRIC DISCHARGE MACHINING METHOD AND ELECTRIC DISCHARGE MACHINE

(71) Applicant: Mitsubishi Electric Corporation, Tokyo (JP)

(72) Inventors: Kiyohito Kamiya, Tokyo (JP); Hidetaka Katougi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/319,405

(22) PCT Filed: Jul. 30, 2014

(86) PCT No.: PCT/JP2014/070124
§ 371 (c)(1),
(2) Date: Dec. 16, 2016

(87) PCT Pub. No.: WO2016/016976
PCT Pub. Date: Feb. 4, 2016

(65) Prior Publication Data
US 2017/0151619 A1  Jun. 1, 2017

(51) Int. Cl.
*B23H 7/22* (2006.01)
*B23H 7/20* (2006.01)

(52) U.S. Cl.
CPC ............. *B23H 7/22* (2013.01); *B23H 7/20* (2013.01)

(58) Field of Classification Search
CPC ...... B23H 9/006; B23H 2500/20; B23H 1/04; B23H 7/105; B23H 7/20; B23H 7/22
See application file for complete search history.

(56) References Cited

U.S. PATENT DOCUMENTS

| 4,725,704 A | * | 2/1988 | Vuichard | ................ B23H 7/26 |
| | | | | 219/69.1 |
| 4,900,890 A | * | 2/1990 | Masaki | .................... B23H 9/00 |
| | | | | 219/69.12 |

(Continued)

FOREIGN PATENT DOCUMENTS

| JP | 63-028519 A | 2/1988 |
| JP | 64-078727 A | 3/1989 |

(Continued)

OTHER PUBLICATIONS

Notification of Reasons for Refusal issued in the corresponding JP App. No. 2015-527699 dated Sep. 15, 2015.

(Continued)

*Primary Examiner* — Geoffrey S Evans
(74) *Attorney, Agent, or Firm* — Sughrue Mion, PLLC; Richard C. Turner

(57) ABSTRACT

An electric discharge machining method for machining a core pin for a resin die using an electric discharge machine including a secondary electrode for molding of a round-bar shaped machining electrode. The electric discharge machining method includes a step of executing generating electric discharge machining for cutting out a schematic shape of the core pin from a work with the machining electrode, a step of transferring a shape element of the secondary electrode to the machining electrode and molding the machining electrode for diesinking electric discharge machining, and a step of applying the diesinking electric discharge machining to the work cut out in the schematic shape of the core pin using the machining electrode molded for the diesinking electric discharge machining.

6 Claims, 13 Drawing Sheets

(56) References Cited

U.S. PATENT DOCUMENTS

| | | | | |
|---|---|---|---|---|
| 5,345,052 A | * | 9/1994 | Puddephatt | B23H 9/006 |
| | | | | 219/69.16 |
| 5,396,040 A | * | 3/1995 | Girardin | B23H 1/00 |
| | | | | 219/69.15 |
| 2001/0014295 A1 | * | 8/2001 | Goto | B23H 1/04 |
| | | | | 419/8 |
| 2010/0252533 A1 | | 10/2010 | Mercier et al. | |

FOREIGN PATENT DOCUMENTS

| | | | |
|---|---|---|---|
| JP | 02-167625 A | | 6/1990 |
| JP | 05-177446 A | | 7/1993 |
| JP | 2000-246547 A | | 9/2000 |
| JP | 2001-105234 A | | 4/2001 |
| JP | 2002-254247 A | | 9/2002 |
| JP | 2004-142087 A | | 5/2004 |
| JP | 2006-032234 A | | 2/2006 |
| JP | 2009-279735 A | | 12/2009 |
| JP | 2013-256085 A | * | 12/2013 |

OTHER PUBLICATIONS

International Search Report of PCT/JP2014/070124 dated Oct. 28, 2014 [PCT/ISA/210].

* cited by examiner

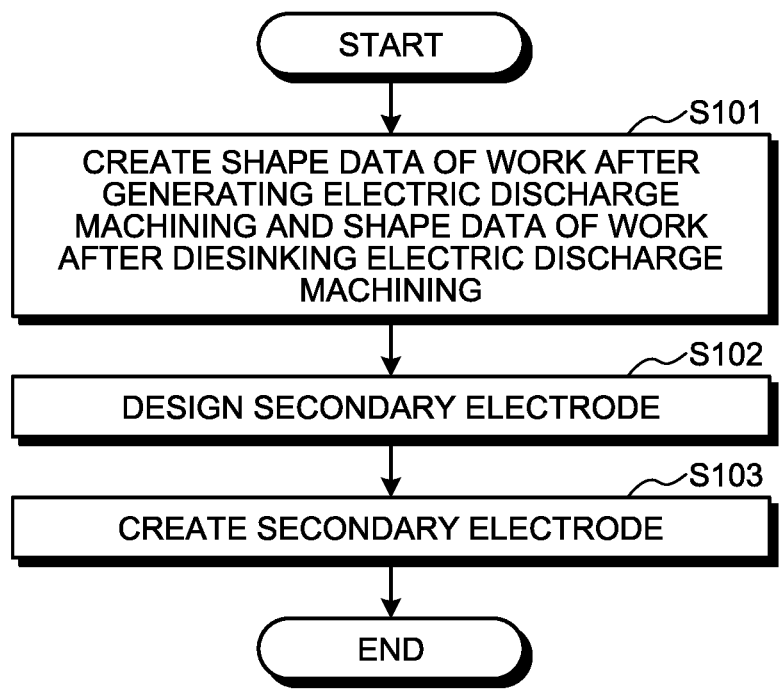
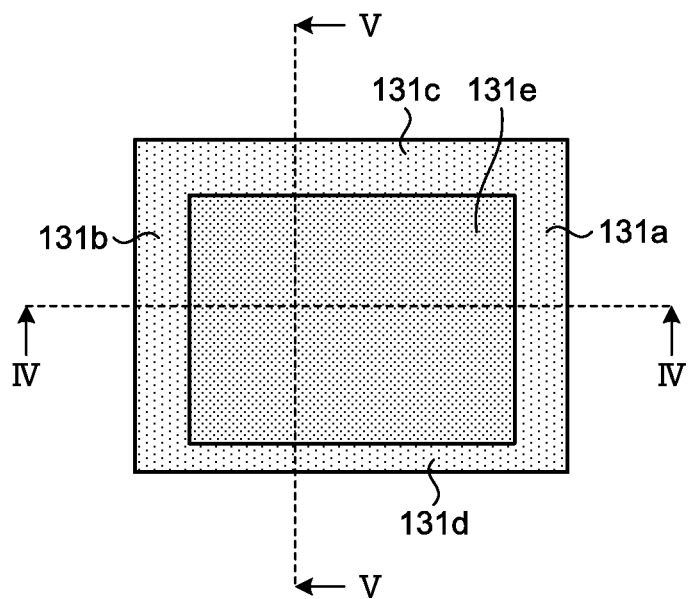

US 9,849,530 B2

ELECTRIC DISCHARGE MACHINING METHOD AND ELECTRIC DISCHARGE MACHINE

CROSS REFERENCE TO RELATED APPLICATIONS

This application is a National Stage of International Application No. PCT/JP2014/070124, filed Jul. 30, 2014, the contents of which are incorporated herein by reference in its entirety.

FIELD

The present invention relates to an electric discharge machining method and an electric discharge machine that can reduce an electrode completion waiting time during core pin manufacturing.

BACKGROUND

A connector for connection of an electronic apparatus is formed by injection molding of resin (see Patent Literature 1). A diesinking electric discharge machine is used for machining of a core pin for providing a hole in a resin molded product. Electrodes used in the diesinking electric discharge machine are generally manufactured by cutting, grinding, or wire electric discharge machining.

CITATION LIST

Patent Literature

Patent Literature 1: Japanese Patent Application Laid-Open No. 2006-032234

SUMMARY

Technical Problem

In the diesinking electric discharge machining of the core pin, a plurality of processes are generally present. Electrodes in all of the processes need to be prepared in machining one core pin. Therefore, when at least one process in which the electrode is not prepared is present among the processes, the machining of the core pins cannot be completed. Therefore, a lead time increase.

The present invention has been devised in view of the above and an object of the present invention is to reduce an electrode completion waiting time during core pin manufacturing.

Solution to Problem

In order to solve the aforementioned problem and achieve the object, the present invention provides an electric discharge machining method for machining a core pin for a resin die using an electric discharge machine including a secondary electrode for molding of a round-bar shaped machining electrode, the electric discharge machining method including: a step of executing generating electric discharge machining for cutting out a schematic shape of the core pin from a work with the machining electrode; a step of transferring a shape element of the secondary electrode to the machining electrode and molding the machining electrode for diesinking electric discharge machining; and a step of applying the diesinking electric discharge machining to the work cut out in the schematic shape of the core pin using the machining electrode molded for the diesinking electric discharge machining.

Advantageous Effects of Invention

The electric discharge machining method according to the present invention achieves an effect that it is possible to reduce an electrode completion waiting time during core pin manufacturing.

BRIEF DESCRIPTION OF DRAWINGS

FIG. 2 is a flowchart showing a flow of the operation of pretreatment of core pin machining by a computer aided design and manufacturing apparatus.

FIG. 3 is a side view showing an example of a secondary electrode.

DESCRIPTION OF EMBODIMENTS

Embodiments of an electric discharge machine and an electric discharge machining method according to the present invention are explained in detail below with reference to the drawings. Note that the present invention is not limited by the embodiments.

First Embodiment

Figure 1:
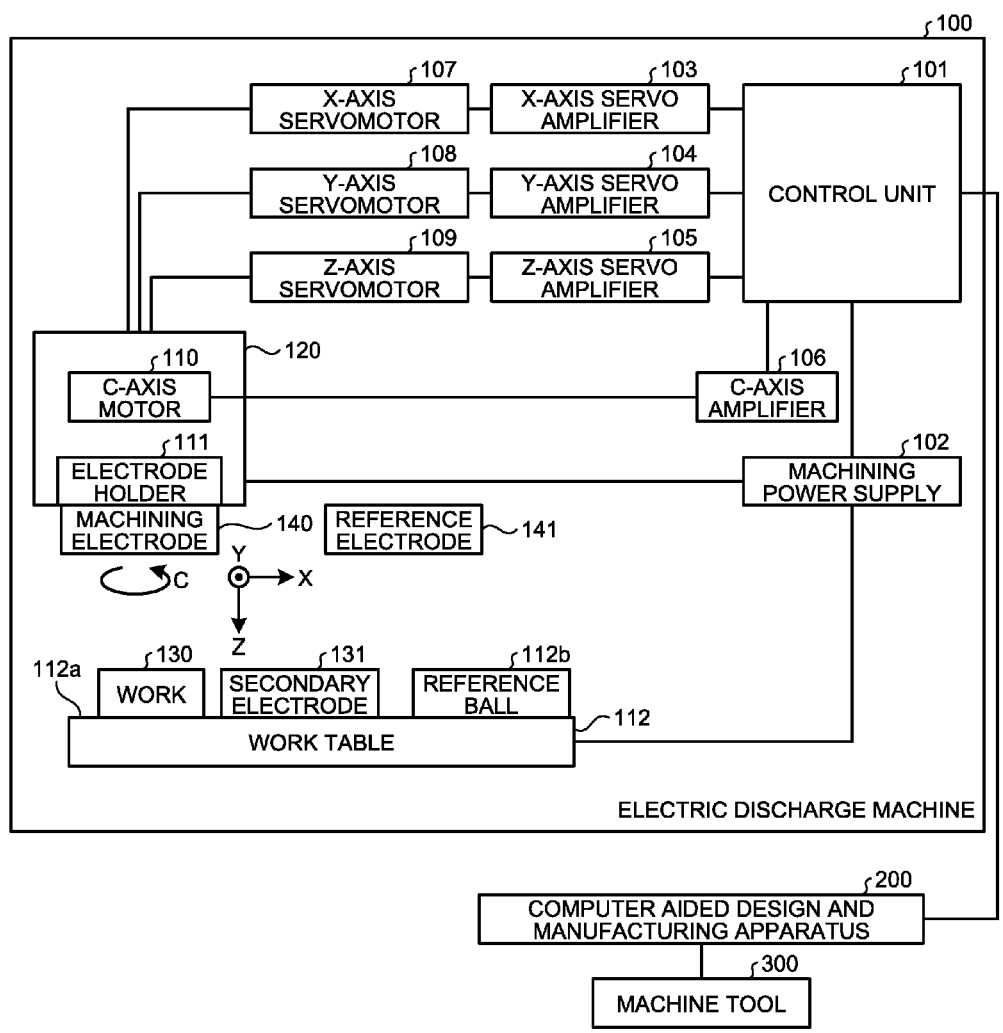
FIG. 1 is a configuration diagram of an electric discharge machine according to a first embodiment of the present invention.

FIG. 1 is a configuration diagram of an electric discharge machine according to a first embodiment of the present invention. An electric discharge machine 100 includes a control unit 101, a machining power supply 102, an X-axis servo amplifier 103, a Y-axis servo amplifier 104, a Z-axis servo amplifier 105, a C-axis amplifier 106, an X-axis servomotor 107, a Y-axis servomotor 108, a Z-axis servomotor 109, a machining head 120, and a work table 112. The machining head 120 includes a C-axis motor 110 and an electrode holder 111.

The work table 112 is a table on which a work 130, which is a workpiece, is placed. An X axis and a Y axis of the electric discharge machine 100 are parallel to a placing surface 112a on which the work 130 is placed. Note that a Z axis of the electric discharge machine 100 extends in a direction perpendicular to the placing surface 112a of the work table 112. A C axis of the electric discharge machine 100 extends in a direction parallel to the Z axis. That is, an X direction is a left-right direction in front view of the electric discharge machine 100. A Y direction is a front-back direction in the front view of the electric discharge machine 100. A Z direction is an up-down direction in the front view of the electric discharge machine 100. Note that, in the front view of the electric discharge machine 100, the front-back direction can be the X direction and the left-right direction can be the Y direction.

The control unit 101 executes a numerical control program input from a computer aided design and manufacturing apparatus 200 to control the operations of the sections of the electric discharge machine 100. The X-axis servo amplifier 103 outputs a movement amount in the X direction to the X-axis servomotor 107 on the basis of a position command from the control unit 101. The Y-axis servo amplifier 104 outputs a movement amount in the Y direction to the Y-axis servomotor 108 on the basis of a position command from the control unit 101. The Z-axis servo amplifier 105 outputs a movement amount in the Z direction to the Z-axis servomotor 109 on the basis of a position command from the control unit 101. The X-axis servomotor 107 rotates on the basis of the movement amount input from the X-axis servo amplifier 103 to thereby move the machining head 120 in the X direction. The Y-axis servomotor 108 rotates on the basis of the movement amount input from the Y-axis servo amplifier 104 to thereby move the machining head 120 in the Y direction. The Z-axis servomotor 109 rotates on the basis of the movement amount input from the Z-axis servo amplifier 105 to thereby move the machining head 120 in the Z direction.

The C-axis amplifier 106 outputs a rotation angle to the C-axis motor 110 that rotates the electrode holder 111. The C-axis motor 110 rotates the electrode holder 111 on the basis of the rotation angle input from the C-axis amplifier 106.

The electrode holder 111 holds a machining electrode 140 for electric discharge machining or a reference electrode 141 for positioning of the work 130. The machining electrode 140 has a round bar shape. However, as explained below, the machining electrode 140 can be molded into another shape using a secondary electrode 131. A specific example of the material of the machining electrode 140 includes copper. Another specific example of the material of the machining electrode 140 includes a copper-tungsten alloy. The machining electrode 140 is held by the electrode holder 111 such that a center axis is located on a rotation axis of the C axis. When the electrode holder 111 is rotated by the C-axis motor 110, the machining electrode 140 or the reference electrode 141 held by the electrode holder 111 also rotates together with the electrode holder 111. The C axis extends in a direction parallel to the Z axis. Therefore, when the electrode holder 111 is rotated by the C-axis motor 110, the machining electrode 140 or the reference electrode 141 held by the electrode holder 111 rotates with a rotation axis set in a direction orthogonal to an XY plane.

The secondary electrode 131 used for molding of the work 130 and the machining electrode 140 is set on the work table 112. A specific example of the material of the secondary electrode 131 includes a copper-tungsten alloy. The work table 112 includes a reference ball 112b for positioning of the machining electrode 140.

The machining power supply 102 applies a pulse voltage for electric discharge machining between the electrode holder 111 and the work table 112 on the basis of machining conditions input from the control unit 101. Electric discharge machining of the work 130 by the machining electrode 140 or electric discharge machining of the machining electrode 140 by the secondary electrode 131 are performed by a voltage applied by the machining power supply 102.

The computer aided design and manufacturing apparatus 200 creates a numerical control program executed by the electric discharge machine 100 in performing machining of a core pin for a resin die. The computer aided design and manufacturing apparatus 200 controls a machine tool 300 to execute an operation for machining the secondary electrode 131. The machine tool 300 is a general machine tool. Examples of the machine tool 300 include a cutting apparatus, a grinding apparatus, and a wire electric discharge machining apparatus. However, the machine tool 300 can be machine tools of types different from these apparatuses.

FIG. 2 is a flowchart showing a flow of the operation of pretreatment of core pin machining by the computer aided design and manufacturing apparatus. First, at step S101, the computer aided design and manufacturing apparatus 200 analyzes machining for molding the work 130 into a core pin for a resin die and creates shape data of the work 130 after generating electric discharge machining and shape data of the work 130 after diesinking electric discharge machining. Note that the shape of the work 130 after the generating electric discharge machining is a schematic shape of the core pin and the shape of the work 130 after the diesinking electric discharge machining is the shape of a completed core pin.

Subsequently, at step S102, the computer aided design and manufacturing apparatus 200 designs, on the basis of the shape data of the work 130 after the diesinking electric discharge machining, the secondary electrode 131 used for molding of the machining electrode 140. The secondary electrode 131 is designed to include all shape elements used in molding the machining electrode 140 for the diesinking electric discharge machining and a flat surface used in molding the machining electrode 140 for the generating electric discharge machining. The "shape element" is a surface for forming, in the machining electrode 140, a shape transferred to the work 130 by the diesinking electric discharge machining. It is possible to not only form, in the machining electrode 140, the transfer shape of the shape element of the secondary electrode 131 but also mold the machining electrode 140 into a shape obtained by combining a plurality of shape elements. As an example, if a shape formed by two surfaces is transferred from the machining electrode 140 to the work 130 by the diesinking electric discharge machining, the machining electrode 140 is molded for the diesinking electric discharge machining using two shape elements of the secondary electrode 131. After the design of the secondary electrode 131 is completed, at step S103, the computer aided design and manufacturing apparatus 200 controls the machine tool 300 to manufacture the secondary electrode 131.

Figure 4:
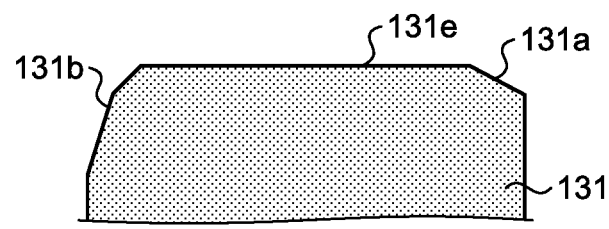
FIG. 4 is a sectional view showing the example of the secondary electrode.
Figure 5:
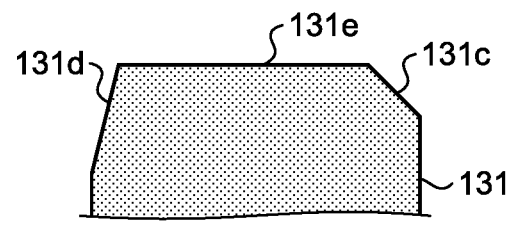
FIG. 5 is a sectional view showing the example of the secondary electrode.

FIG. 3 is a side view showing an example of the secondary electrode. FIG. 4 and FIG. 5 are sectional views showing the secondary electrode. FIG. 4 shows a cross section taken along line IV-IV in FIG. 3. FIG. 5 shows a cross section taken along line V-V in FIG. 3. The secondary electrode 131 includes four shape elements 131a, 131b, 131c, and 131d and a flat surface 131e.

Figure 6:
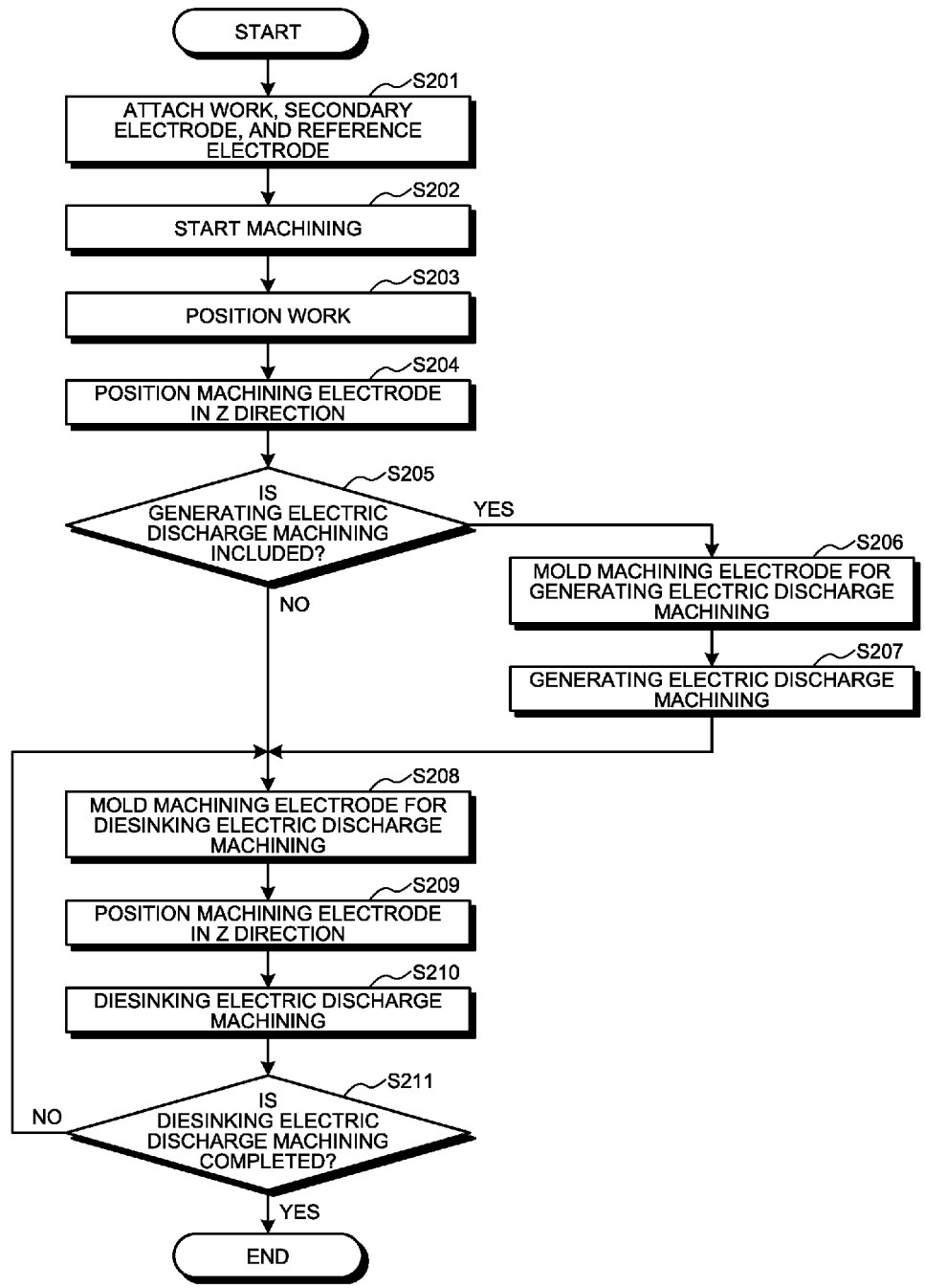
FIG. 6 is a flowchart showing a flow of the operation of the electric discharge machine according to the first embodiment.

FIG. 6 is a flowchart showing a flow of the operation of the electric discharge machine according to the first embodiment. First, at step S201, an operator sets the work 130 and the secondary electrode 131 on the work table 112 shown in FIG. 1 and attaches the reference electrode 141 to the electrode holder 111. When the setting of the work 130, the secondary electrode 131, and the reference electrode 141 is completed, at step S202, the operator starts machining of a core pin. When the machining is started, at step S203, the control unit 101 positions the work 130. As an example, the control unit 101 brings the reference electrode 141 attached to the electrode holder 111 shown in FIG. 1 into contact with the work 130 from ±X, ±Y, and ±Z directions to thereby measure a position and a posture of the work 130 on the work table 112. The posture of the work 130 is a tilt of the work 130 in the XY plane, that is, a shift between the directions of the X and Y axes of the electric discharge machine 100 and longitudinal and lateral directions of the work 130.

By measuring the tilt of the work 130 in the XY plane, even if the longitudinal and lateral directions of the work 130 and the directions of the X and Y axes of the electric discharge machine 100 shift, it is possible to correct the tilt and perform machining. That is, the control unit 101 moves the machining head 120 in a direction shifted by an angle equivalent to the shift between the longitudinal and lateral directions of the work 130 and the directions of the X and Y axes of the electric discharge machine 100 from a direction designated by a control program input from the computer aided design and manufacturing apparatus 200. Consequently, the control unit 101 can perform the generating electric discharge machining and the diesinking electric discharge machining on the work 130 while correcting the tilt of the work 130.

Subsequently, at step S204, the control unit 101 changes an electrode held by the electrode holder 111 from the reference electrode 141 to the machining electrode 140 and brings the machining electrode 140 into contact with the reference ball 112b from a +Z direction to thereby position the machining electrode 140 in the Z direction.

When the positioning of the machining electrode 140 is completed, at step S205, the control unit 101 determines whether the generating electric discharge machining is included in the machining for manufacturing the core pin. When the generating electric discharge machining is included in the machining for manufacturing the core pin (Yes at step S205), at step S206, the control unit 101 molds the machining electrode 140 for the generating electric discharge machining. In molding the machining electrode 140 for the generating electric discharge machining, the control unit 101 outputs a position command indicating a molding position to the X-axis servo amplifier 103, the Y-axis servo amplifier 104, and the Z-axis servo amplifier 105 and outputs a rotation angle to the C-axis amplifier 106. The control unit 101 instructs a voltage applied between the work table 112 and the machining head 120.

Figure 7:
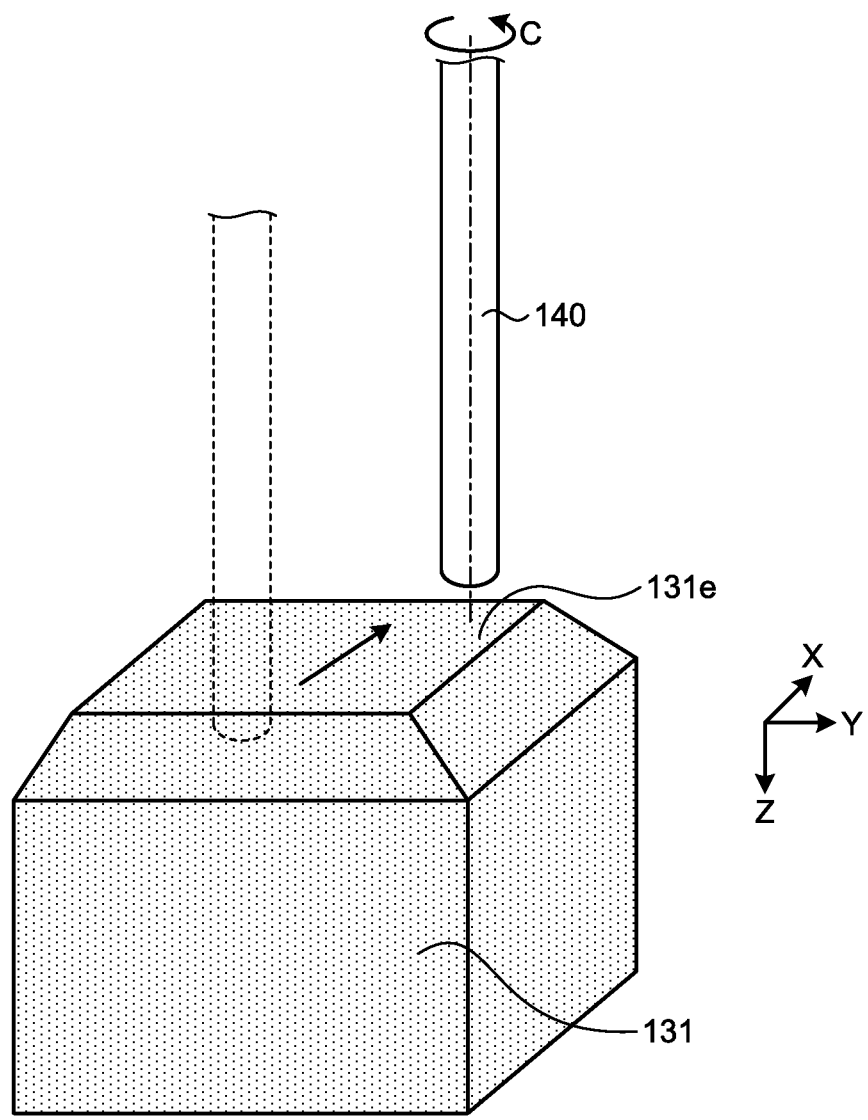
FIG. 7 is a perspective view showing an example of molding for generating electric discharge machining of a machining electrode.

FIG. 7 is a perspective view showing an example of molding for the generating electric discharge machining of the machining electrode. When the electrode holder 111 is rotated around the C axis by the C-axis motor 110, the machining electrode 140 held by the electrode holder 111 rotates with a rotation axis set in the direction orthogonal to the XY plane. When the machining electrode 140 is molded from the generating electric discharge machining, in a state in which a voltage is applied to the work table 112 and the machining head 120, the machining electrode 140 is moved to trace the flat surface 131e of the secondary electrode 131 while the C-axis motor 110 is driven to rotate the machining electrode 140 around the C axis. Consequently, the lower end of the machining electrode 140 is machined flat.

Figure 8:
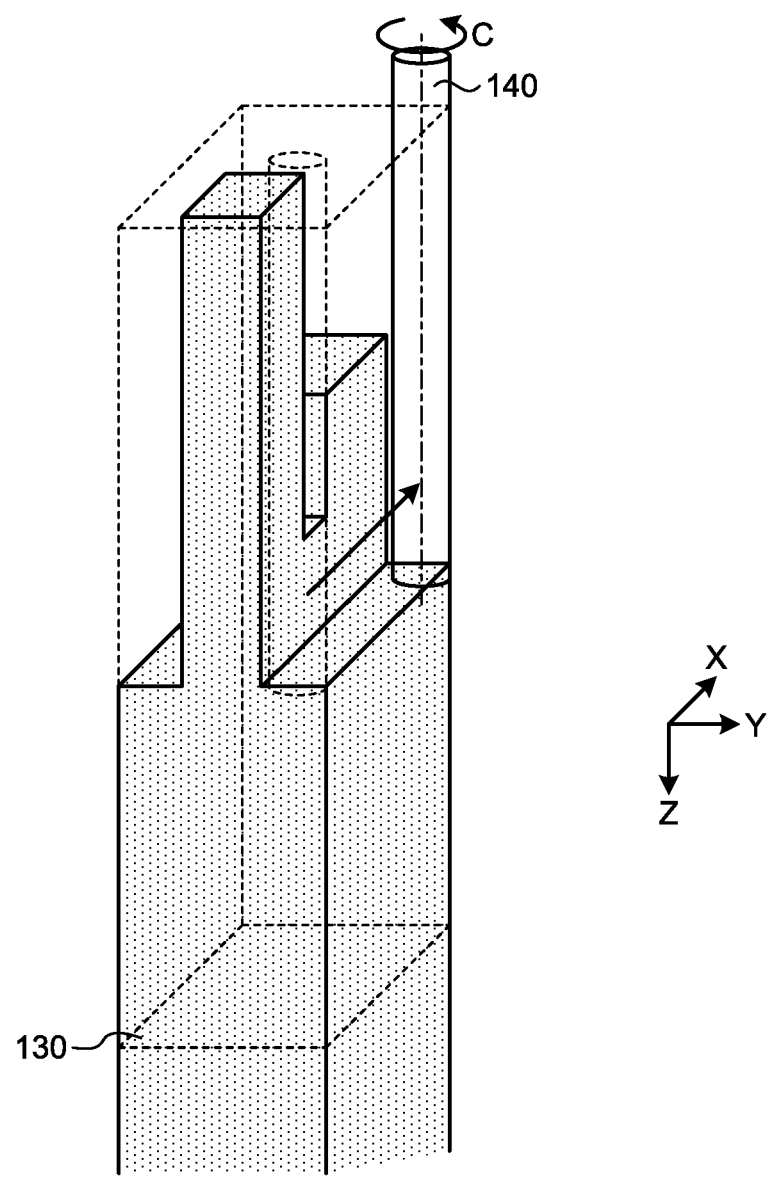
FIG. 8 is a perspective view showing an example of the generating electric discharge machining.

After the lower end of the machining electrode 140 is machined flat, at step S207, the control unit 101 performs the generating electric discharge machining. In performing the generating electric discharge machining, the control unit 101 outputs a position command indicating a machining position and a machining depth to the X-axis servo amplifier 103, the Y-axis servo amplifier 104, and the Z-axis servo amplifier 105 and outputs a rotation angle to the C-axis amplifier 106. The control unit 101 instructs a voltage applied between the work table 112 and the machining head 120. FIG. 8 is a perspective view showing an example of the generating electric discharge machining. As shown in FIG. 8, in the state which the voltage is applied to the work table 112 and the machining head 120, the control unit 101 moves the machining electrode 140 to cut out a schematic shape of a core pin from the work 130.

Figure 9:
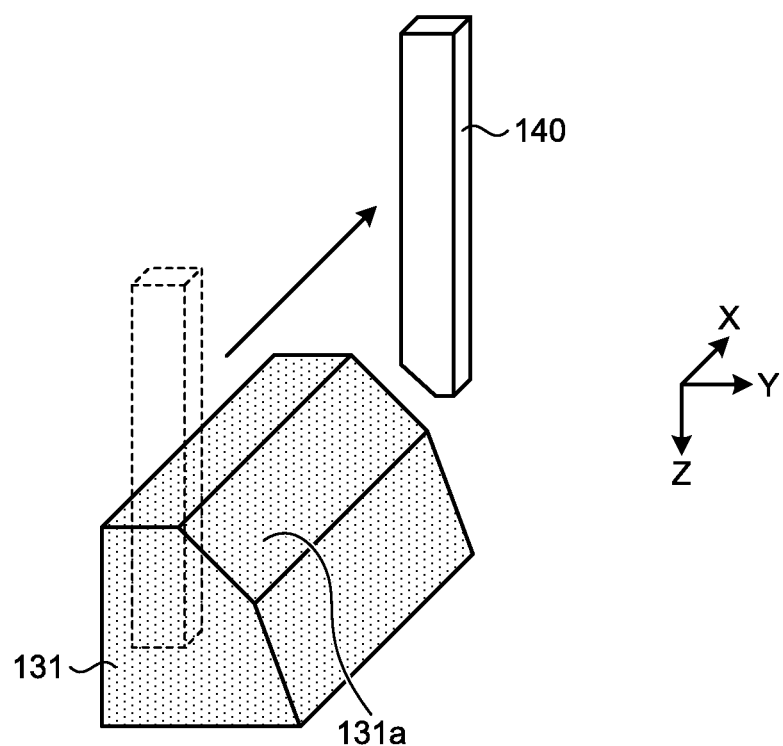
FIG. 9 is a perspective view showing an example of molding for diesinking electric discharge machining of a machining electrode.

When the generating electric discharge machining is completed, at step S208, the control unit 101 molds the machining electrode for the diesinking electric discharge machining. In molding the machining electrode 140 for the diesinking electric discharge machining, the control unit 101 outputs a position command indicating a molding position to the X-axis servo amplifier 103, the Y-axis servo amplifier 104, and the Z-axis servo amplifier 105 and outputs a rotation angle to the C-axis amplifier 106. The control unit 101 instructs a voltage applied between the work table 112 and the machining head 120. FIG. 9 is a perspective view showing an example of the molding for the diesinking electric discharge machining of the machining electrode. In molding the machining electrode 140 for the diesinking electric discharge machining, in the state in which the voltage is applied to the work table 112 and the machining head 120, the control unit 101 moves, while keeping the C-axis motor 110 stopped, the machining electrode 140 to trace the shape element 131a of the secondary electrode 131 to form, in the machining electrode 140, a transfer shape of the shape element 131a of the secondary electrode 131. The control unit 101 combines a plurality of shape elements 131a, 131b, 131c, and 131d to form, in the machining electrode 140, a shape transferred to the work 130.

It is possible to machine a side surface of the machining electrode 140 as a flat surface by moving the machining electrode 140 along a side surface of the secondary electrode 131. For example, it is also possible to mold the machining electrode 140 into a square pillar shape.

At step S209, the control unit 101 brings the machining electrode 140 molded for the diesinking electric discharge machining into contact with the reference ball 112b shown in FIG. 1 from the +Z direction to thereby position the machining electrode 140 in the Z direction.

When the positioning in the Z direction of the machining electrode 140 is completed, at step S210, the control unit 101 moves the machining head 120 such that the machining electrode 140 is disposed in a machining position. Thereafter, in the state in which the voltage is applied to the work table 112 and the machining head 120, the control unit 101 brings the machining electrode 140 close to the work 130 from the +Z direction to apply the diesinking electric discharge machining to the work 130. In applying the diesinking electric discharge machining, the control unit 101 outputs a position command indicating a molding position and a machining depth to the X-axis servo amplifier 103, the Y-axis servo amplifier 104, and the Z-axis servo amplifier 105 and outputs a rotation angle to the C-axis amplifier 106. The control unit 101 instructs a voltage applied between the work table 112 and the machining head 120.

Figure 10:
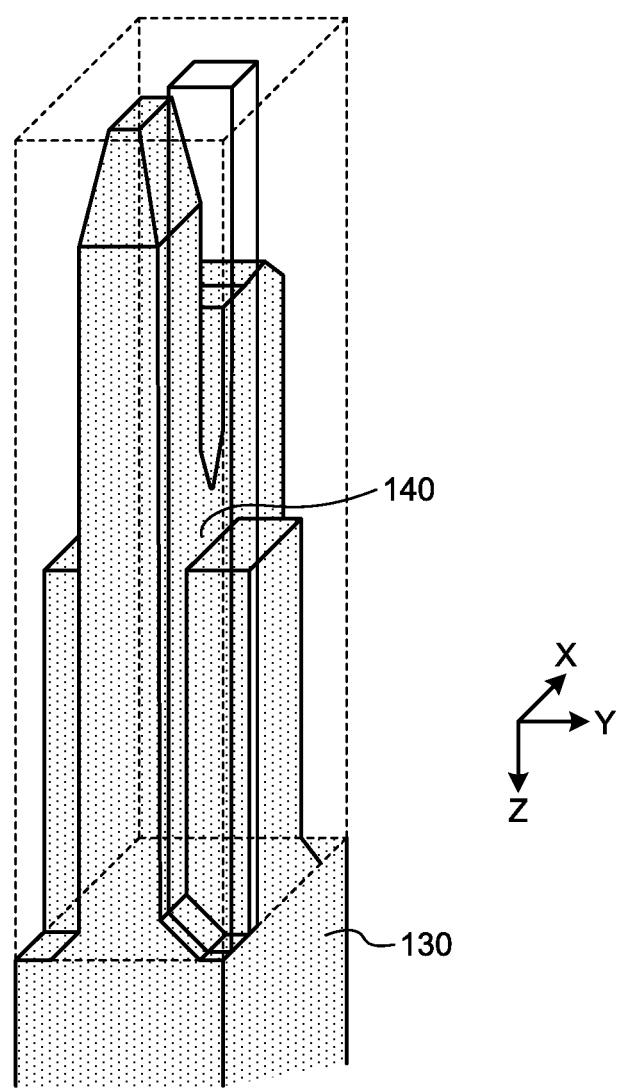
FIG. 10 is a perspective view showing an example of the diesinking electric discharge machining.

FIG. 10 is a perspective view showing an example of the diesinking electric discharge machining. In the state in which the voltage is applied to the work table 112 and the machining head 120, the control unit 101 moves the machining electrode 140 in the Z direction to transfer the shape of the machining electrode 140 to the work 130. After transferring the shape of the machining electrode 140 to the work 130 through the diesinking electric discharge machining, at step S211, the control unit 101 determines whether the diesinking electric discharge machining is completed. At step S211, when the control unit 101 executes the numerical control program input from the computer aided design and manufacturing apparatus 200 to the end, the control unit 101 determines that the diesinking electric discharge machining is completed. When the diesinking electric discharge machining is not completed (No at step S211), the control unit 101 proceeds to step S208 and repeats step S208 to step S211 until the diesinking electric discharge machining is completed. When the diesinking electric discharge machining is completed (Yes at step S211), the control unit 101 ends the processing. The control unit 101 repeats steps S208 to S211 to thereby perform, a plurality of time, in a process for molding the machining electrode for the diesinking electric discharge machining, while changing a shape element transferred from the secondary electrode to the machining electrode, the process for molding the machining electrode for the diesinking electric discharge machining and the process for executing the diesinking electric discharge machining.

Note that, when the diesinking electric discharge machining for transferring the same shape from the machining electrode 140 to the work 130 is continuously performed, the control unit 101 proceeds to step S209 after step S211/No. It is possible to omit the processing for molding the machining electrode 140 for the diesinking electric discharge machining.

Figure 11:
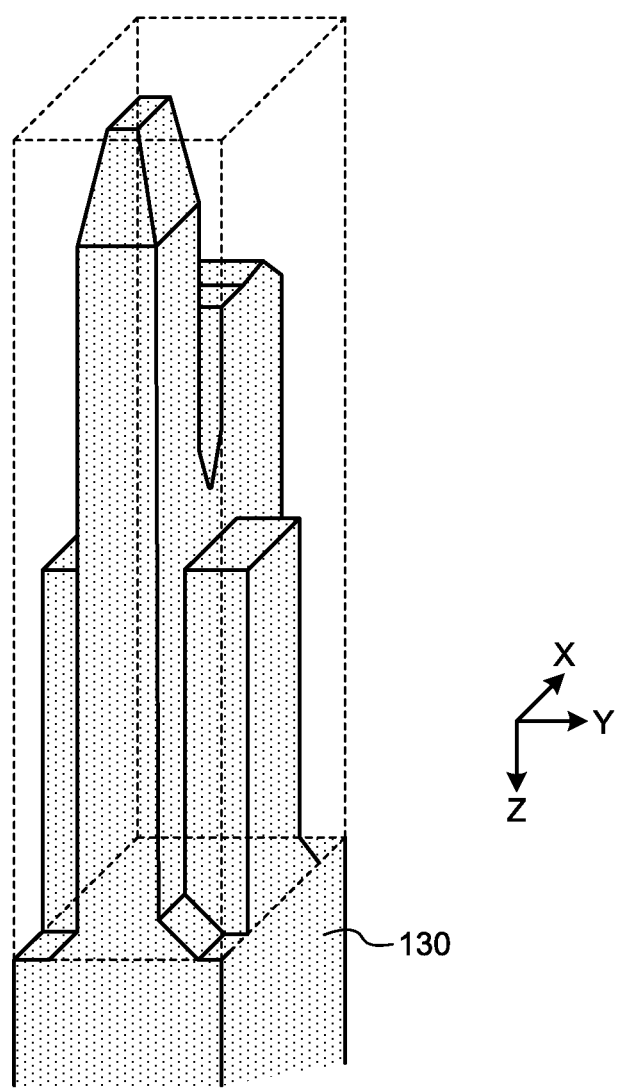
FIG. 11 is a perspective view showing an example of a work after machining completion.

FIG. 11 is a perspective view showing an example of the work after the machining completion. The control unit 101 applies the diesinking electric discharge machining to the work 130, from which the external shape of the core pin is cut out by the generating electric discharge machining, and transferring the shape of the machining electrode 140 to the work 130, whereby the work 130 is machined into the shape of the core pin.

An electric discharge machine in which a machining electrode for generating electric discharge machining and a machining electrode for diesinking electric discharge machining are separate is explained as a comparative example. The electric discharge machine in the comparative example is the same as the electric discharge machine 100 in the first embodiment in that the generating electric discharge machining is performed by the round-bar shaped machining electrode.

Figure 12:
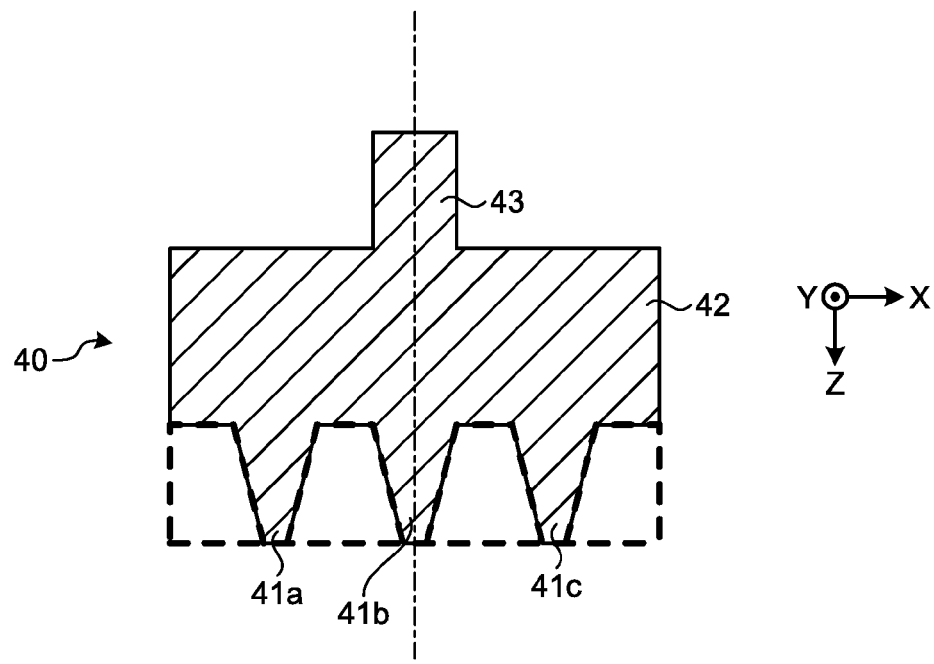
FIG. 12 is a schematic diagram of a machining electrode for diesinking electric discharge machining used by an electric discharge machine in a comparative example.

FIG. 12 is a schematic diagram of an electrode for diesinking electric discharge machining used by the electric discharge machine in the comparative example. An electrode for diesinking electric discharge machining 40 used by the electric discharge machine in the comparative example has structure in which a plurality of electrode sections 41a, 41b, and 41c project from a base section 42. The electrode sections 41a, 41b, and 41c are formed in the same shape. A holding section 43 projects from the base section 42 in a direction opposite to a direction in which the electrode sections 41a, 41b, and 41c project from the base section 42. The holding section 43 is held, whereby the electrode for diesinking electric discharge machining is attached to an electrode holder included in the electric discharge machine in the comparative example. The electrode for diesinking electric discharge machining 40 includes the electrode sections 41a, 41b, and 41c having the same shape to make it unnecessary to replace the electrode for diesinking electric discharge machining 40 when the same shape is transferred to a plurality of places of a work. That is, when the electrode section 41a is worn, the diesinking electric discharge machining can be performed using the other electrode sections 41b and 41c. Therefore, it is unnecessary to replace the electrode for diesinking electric discharge machining 40 until all of the electrode sections 41a, 41b, and 41c are worn.

In the machining electrode 40 having the structure in which the electrode sections 41a, 41b, and 41c are projected from the base section 42, portions among the electrode sections 41a, 41b, and 41c are removed by machining when the electrode for diesinking electric discharge machining 40 is manufactured. In FIG. 12, the portions to be removed when the electrode for diesinking electric discharge machining 40 is manufactured are shown by being surrounded by broken lines.

Some of the electrode sections 41a, 41b, and 41c are formed in positions shifted from the holding section 43. Therefore, when the electrode sections 41a, 41b, and 41c in use are changed, prior to starting the diesinking electric discharge machining, positioning work of the electrode for diesinking electric discharge machining 40 is necessary not only in the Z direction but also in the X direction and the Y direction.

Further, the electrode for diesinking electric discharge machining 40 includes only the electrode sections 41a, 41b, and 41c having the same shape. Therefore, when another shape is transferred to the work by the diesinking electric discharge machining, the electrode for diesinking electric discharge machining 40 needs to be replaced with another electrode for diesinking electric discharge machining.

On the other hand, the electric discharge machine 100 according to the first embodiment uses the same machining electrode 140 in both of the generating electric discharge machining and the diesinking electric discharge machining. Therefore, when the electric discharge machine 100 shifts from the generating electric discharge machining to the diesinking electric discharge machining, unlike the comparative example, it is unnecessary to replace the machining electrode 140. Therefore, it is possible to reduce time required from a machining start to a machining end compared with the comparative example in which the different machining electrodes are used in the generating electric discharge machining and the diesinking electric discharge machining.

The machining electrode 140 has the round bar shape. The center axis of the machining electrode 140 is located on the rotation axis of the C axis. Therefore, positioning of the machining electrode 140 in the X direction and the Y direction is unnecessary. Even after the machining electrode 140 is molded for the diesinking electric discharge machining, because the center of the round bar in the original shape of the machining electrode 140 is located on the rotation axis of the C axis, positioning of the machining electrode 140 in the X direction and the Y direction is unnecessary. Therefore, it is possible to reduce the time required from the machining start to the machining end compared with when the positioning of the machining electrode 140 in the X direction and the Y direction is necessary.

Figure 13:
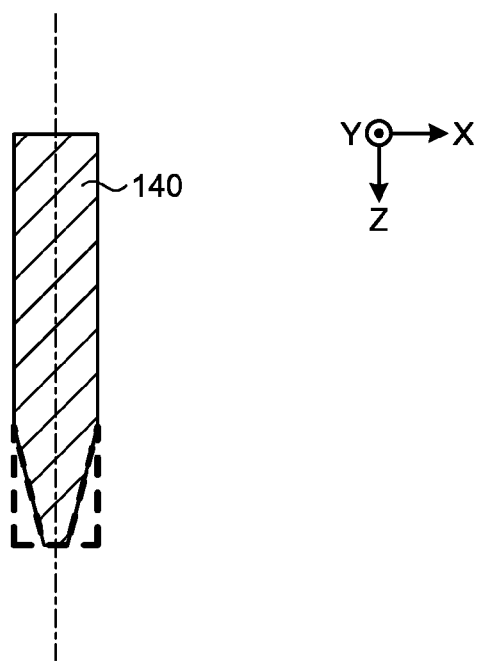
FIG. 13 is a schematic diagram showing an example of a portion removed when the machining electrode is molded for diesinking electric discharge in the first embodiment.

FIG. 13 is a schematic diagram showing an example of a portion removed when the machining electrode is molded for the diesinking electric discharge machining in the first embodiment. In FIG. 13, the portion removed when the machining electrode 140 is molded for the diesinking electric discharge machining is shown by being surrounded by a broken line. Because the bar-shaped machining electrode 140 is molded for the diesinking electric discharge machining, a portion to be removed is small compared with the machining electrode 40 having the structure in which the electrode sections 41a, 41b, and 41c are projected from the base section 42 shown in FIG. 12. Consequently, it is possible to reduce electrode materials discharged without being used for electric discharge machining and achieve a reduction in cost.

By using the secondary electrode 131 including a plurality of shape elements, it is possible to mold the machining electrode 140 into a different plurality of shapes. Therefore, it is possible to perform, with one machining electrode 140, the diesinking electric discharge machining for transferring different shapes to the work 130. Therefore, even when, after the diesinking electric discharge machining for transferring a certain shape from the machining electrode 140 to the work 130 is performed, the diesinking electric discharge machining for transferring another shape to the work 130 is performed, the machining electrode 140 only has to be molded again. Replacement of the machining electrode 140 is unnecessary. Therefore, it is possible to reduce the time required from the machining start to the machining end compared with when replacement of an electrode is necessary.

Figure 14:
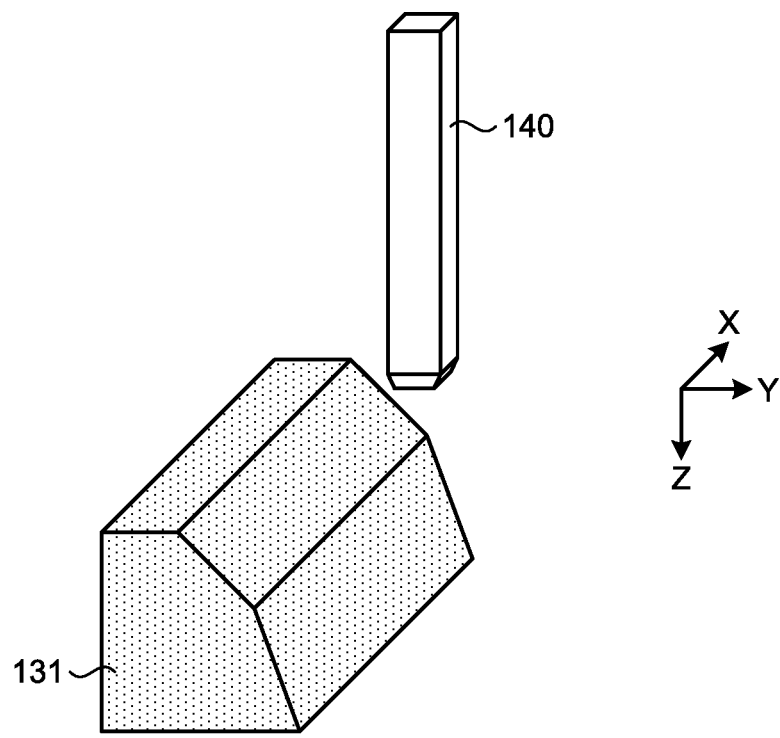
FIG. 14 is a perspective view showing an example of a machining electrode to which a plurality of transfer shapes are given.

Note that it is also possible to simultaneously give a plurality of transfer shapes to the machining electrode 140. FIG. 14 is a perspective view showing an example of a machining electrode to which a plurality of transfer shapes are given. By simultaneously giving the transfer shapes to the machining electrode 140, when, after the diesinking electric discharge machining for transferring a certain shape from the machining electrode 140 to the work 130 is performed, the diesinking electric discharge machining for transferring another shape from the machining electrode 140 to the work 130 is performed, it is unnecessary to mold the machining electrode 140 again. Therefore, it is possible to further reduce the time required until the machining end compared with when the machining electrode 140 is molded again.

In the above explanation, the lower end portion is machined flat when the machining electrode is molded for the generating electric discharge machining. However, the diameter of the machining electrode can be reduced in molding after the generating electric discharge machining. By performing the generating electric discharge machining using the machining electrode having the reduced diameter, it is possible to form, in the generating electric discharge machining, an arc having a diameter smaller than the diameter of the original machining electrode.

The electric discharge machine 100 according to the first embodiment executes, with the machining electrode 140, the generating electric discharge machining for cutting out a schematic shape of a core pin from the work 130, transfers a shape element of the secondary electrode 131 to the machining electrode 140, molds the machining electrode 140 for the diesinking electric discharge machining, and applies, using the machining electrode 140 molded for the diesinking electric discharge machining, the diesinking electric discharge machining to the work 130 cut out in a schematic shape of a core pin. Therefore, an electrode completion waiting time does not occur during core pin manufacturing. Consequently, it is possible to reduce the time required until the machining end of the core pin compared with when the generating electric discharge machining and the diesinking electric discharge machining are performed using a plurality of electrodes.

Second Embodiment

Figure 15:
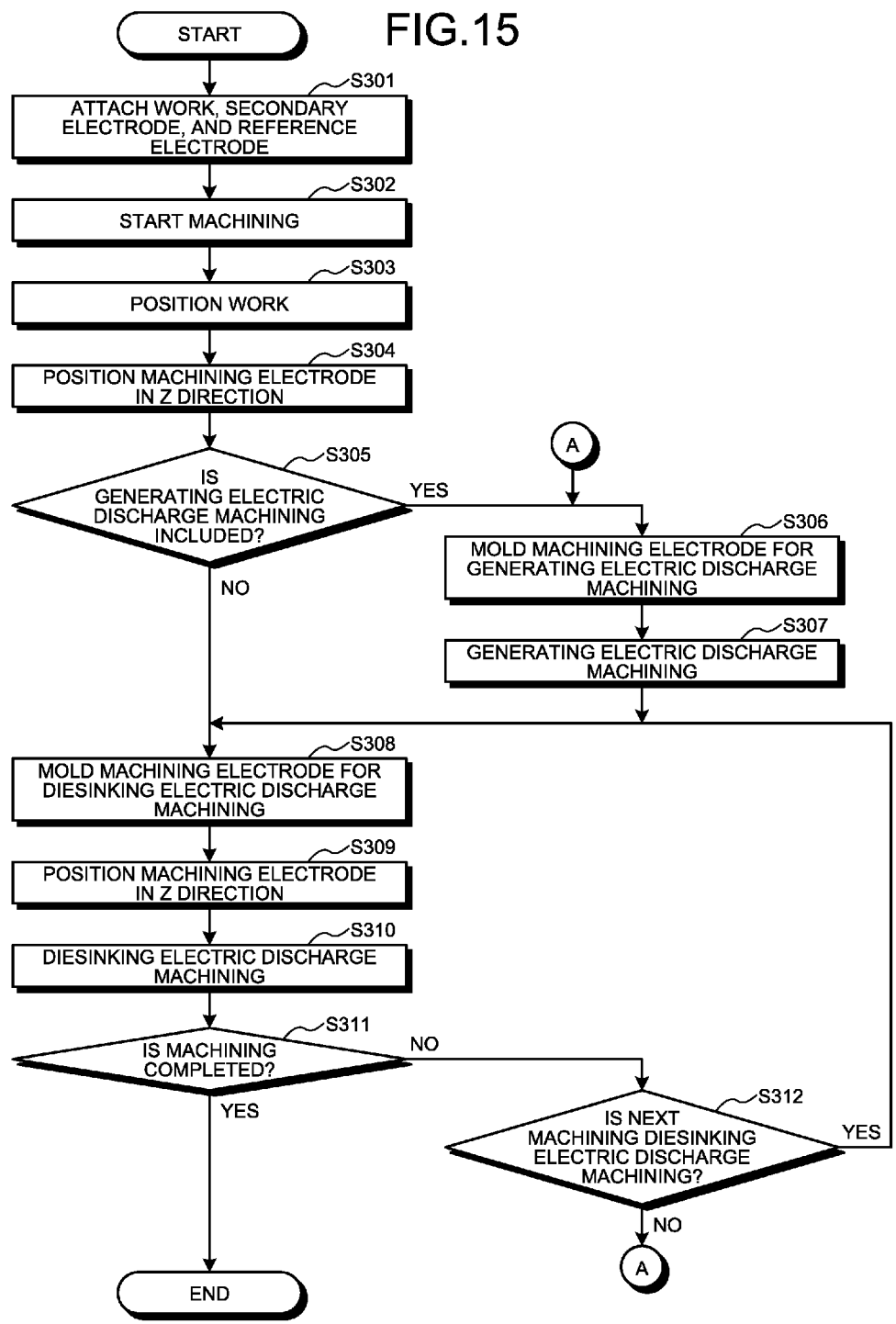
FIG. 15 is a flowchart showing a flow of the operation of an electric discharge machine according to a second embodiment.

The configuration of an electric discharge machine according to a second embodiment of the present invention is the same as the configuration in the first embodiment. FIG. 15 is a flowchart showing a flow of the operation of the electric discharge machine according to the second embodiment. An operation at steps S301 to S310 is the same as the operation at steps S201 to S210 in the first embodiment. After the shape of the machining electrode 140 is transferred to the work 130 by the diesinking electric discharge machining, at step S311, the control unit 101 determines whether the machining is completed. When the machining is not completed (No at step S311), at step S312, the control unit 101 determines whether the next machining is the diesinking electric discharge machining. When the next machining is the diesinking electric discharge machining (Yes at step S312), the control unit 101 molds the machining electrode 140 for the diesinking electric discharge machining (step S308), performs positioning in the Z direction of the machining electrode 140 (step S309), and performs the diesinking electric discharge machining (step S310). When the next machining is the generating electric discharge machining (No at step S312), the control unit 101 molds the machining electrode 140 for the generating electric discharge machining (step S306) and thereafter performs the generating electric discharge machining (step S307).

In the second embodiment, even when it is necessary to perform the generating electric discharge machining after performing the diesinking electric discharge machining, the machining electrode 140 only has to be molded again. Replacement of the machining electrode 140 is unnecessary. Therefore, it is possible to reduce the time required from the machining start to the machining end compared with when replacement of an electrode is necessary.

Figure 16:
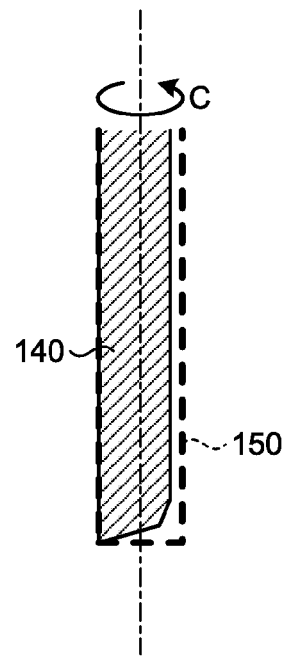
FIG. 16 is a side view showing an example of a region occupied by a machining electrode molded for diesinking electric discharge machining when the machining electrode is rotated by a C-axis motor.
Figure 17:
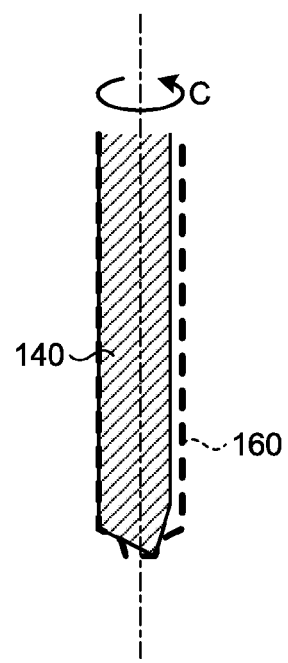
FIG. 17 is a side view showing another example of the region occupied by the machining electrode molded for diesinking electric discharge machining when the machining electrode is rotated by the C-axis motor.

Note that, when a rotating body at the time when the machining electrode 140 molded for the diesinking electric discharge machining is rotated by the C-axis motor 110 has a columnar shape same as the shape of the original round bar, the molding for the generating electric discharge machining can also be omitted. FIG. 16 is a side view showing an example of a region occupied by a machining electrode molded for the diesinking electric discharge machining when the machining electrode is rotated by the C-axis motor. A region 150 occupied by the machining electrode 140 rotated around the C axis has a columnar shape. Therefore, the molding for the generating electric discharge machining can be omitted by performing the generating dielectric discharge machining while driving the C-axis motor 110 to rotate the machining electrode 140. FIG. 17 is a side view showing another example of the region occupied by the machining electrode molded for the diesinking electric discharge machining when the machining electrode is rotated by the C-axis motor. A region 160 occupied by the machining electrode 140 rotated around the C axis does not have a columnar shape. Therefore, to perform the generating electric discharge machining after the diesinking electric discharge machining, it is necessary to mold the machining electrode 140 for the generating electric discharge machining.

According to the second embodiment, replacement of the machining electrode is unnecessary even when it is necessary to perform the generating electric discharge machining after performing the diesinking electric discharge machining. Therefore, it is possible to reduce the time required from the machining start to the machining end compared with when replacement of an electrode is necessary.

REFERENCE SIGNS LIST 40 electrode for diesinking electric discharge machining
41a, 41b, 41c electrode section
42 base section
43 holding section
100 electric discharge machine
101 control unit
102 machining power supply
103 X-axis servo amplifier
104 Y-axis servo amplifier
105 Z-axis servo amplifier
106 C-axis amplifier
107 X-axis servomotor
108 Y-axis servomotor
109 Z-axis servomotor
110 C-axis motor
111 electrode holder
112 work table
112a placing surface
112b reference ball
120 machining head
130 work
131 secondary electrode
131a, 131b, 131c, 131d shape element
131e flat surface
140 machining electrode
141 reference electrode
150, 160 region occupied by the machining electrode rotated around a C-axis
200 computer aided design and manufacturing apparatus
300 machine tool

The invention claimed is:

1. An electric discharge machining method for machining a core pin for a resin die using an electric discharge machine including a secondary electrode for molding a machining electrode, the electric discharge machining method comprising:
executing generating electric discharge machining to machine a workpiece into a shape of the core pin with the machining electrode having a round bar shape;
molding the machining electrode for die-sinking electric discharge machining by machining the machining electrode with at least one shape element of the secondary electrode; and
applying the die-sinking electric discharge machining to the workpiece machined into the shape of the core pin using the machining electrode molded for the die-sinking electric discharge machining,
wherein the secondary electrode includes a plurality of shape elements which include the at least one shape element, and
wherein the molding the machining electrode for the die-sinking electric discharge machining and the applying the die-sinking electric discharge machining are repeated a plurality of times, while the machining electrode is machined with some or all among the plurality of shape elements of the secondary electrode, in the molding the machining electrode for the die-sinking electric discharge machining.

2. The electric discharge machining method according to claim 1, wherein, after the molding the machining electrode for the die-sinking electric discharge and the applying the die-sinking electric discharge machining, the machining electrode is molded into the round bar shape prior to the executing the generating electric discharge machining.

3. An electric discharge machining method for machining a core pin for a resin die using an electric discharge machine including a secondary electrode for molding a machining electrode, the electric discharge machining method comprising:
executing generating electric discharge machining to machine a workpiece into a shape of the core pin with the machining electrode having a round bar shape;
molding the machining electrode for die-sinking electric discharge machining by machining the machining electrode with at least one shape element of the secondary electrode; and
applying the die-sinking electric discharge machining to the workpiece machined into the shape of the core pin using the machining electrode molded for the die-sinking electric discharge machining,
wherein, after the applying the die-sinking electric discharge machining, the molding the machining electrode, which has been molded for the die-sinking electric discharge, into the round bar shape is executed, and the generating electric discharge machining is applied to the workpiece using the machining electrode molded into the round bar shape.

4. An electric discharge machine including a secondary electrode for molding a machining electrode, the electric discharge machine comprising a processor configured to control operations of the electric discharge machine, the operations comprising:
machining a workpiece into a shape of a core pin with the machining electrode having a round bar shape, by generating electric discharge machining;
molding the machining electrode for die-sinking electric discharge machining by machining the machining electrode with at least one shape element of the secondary electrode; and
applying the die-sinking electric discharge machining to the workpiece machined into the shape of the core pin using the machining electrode molded for the die-sinking electric discharge machining,
wherein the secondary electrode includes a plurality of shape elements which include the at least one shave element, and
wherein the molding the machining electrode for the die-sinking electric discharge machining and the applying the die-sinking electric discharge machining are repeated a plurality of times, while the machining electrode is machined with some or all among the plurality of shape elements of the secondary electrode, in the molding the machining electrode for the die-sinking electric discharge machining.

5. The electric discharge machine according to claim 4, wherein the processor is further configured to, after the molding the machining electrode for the die-sinking electric discharge and the applying the die-sinking electric discharge machining, control the electric discharge machine to perform the molding the machining electrode into the round bar shape using the secondary electrode prior to the generating electric discharge machining to the workpiece.

6. An electric discharge machine comprising a secondary electrode and a processor configured to control operations of the electric discharge machine, the operations comprising:

machining a workpiece into a shape of a core pin with a machining electrode by generating electric discharge machining;

molding the machining electrode for die-sinking electric discharge machining by machining the machining electrode with a shape element of the secondary electrode; and applying the die-sinking electric discharge machining to the workpiece machined into the shape of the core pin using the machining electrode molded for the die-sinking electric discharge machining, wherein, when applying generating electric discharge machining to the workpiece after the molding the machining electrode for the die-sinking electric discharge machining, the processor is configured to control the electric discharge machine to perform molding the machining electrode into a round bar shape using the secondary electrode.

* * * * *